US006739503B1

(12) United States Patent
Murison

(10) Patent No.: US 6,739,503 B1
(45) Date of Patent: May 25, 2004

(54) APPARATUS FOR USE IN A SELF-SERVICE TERMINAL AND A METHOD OF PROCESSING A FINANCIAL INSTRUMENT AT A SELF-SERVICE TERMINAL

(75) Inventor: Alexander S. Murison, Waterloo (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/375,760

(22) Filed: Feb. 26, 2003

(51) Int. Cl.7 ................................................ G06F 17/60
(52) U.S. Cl. ......................................... 235/379; 902/18
(58) Field of Search ................................. 235/379, 380, 235/382, 375; 902/8, 9, 14, 18; 705/43, 45

(56) References Cited

U.S. PATENT DOCUMENTS 5,987,439 A * 11/1999 Gustin et al. ............... 235/379
6,527,172 B1 * 3/2003 Lewis et al. ................ 235/379
6,554,185 B1 * 4/2003 Montross et al. ........... 235/379
6,578,760 B1 * 6/2003 Otto ........................... 235/379

* cited by examiner

Primary Examiner—Daniel St. Cyr
(74) Attorney, Agent, or Firm—Michael Chan

(57) ABSTRACT

An endorser is disposed along a document transport path and includes a printhead for printing an endorsement onto a document along the document transport path. The printhead can move through an opening to print an endorsement onto a document along the document transport path. A door covers the opening and is slidable between an open position in which the printhead is able to move through the opening to print an endorsement onto a cheque and a closed position in which the door prevents the cheque from being jammed into the printhead when the cheque is transported along the cheque transport path. The door includes a major surface and a plurality of finger-like projections disposed on the major surface. The plurality of finger-like projections are provided for engaging a cheque when the cheque moves into a position along the cheque transport path for the printhead to print an endorsement onto the cheque.

8 Claims, 15 Drawing Sheets

APPARATUS FOR USE IN A SELF-SERVICE TERMINAL AND A METHOD OF PROCESSING A FINANCIAL INSTRUMENT AT A SELF-SERVICE TERMINAL

BACKGROUND OF THE INVENTION

The present invention relates to a self-service terminal, and is particularly directed to an apparatus for use in a self-service terminal, such as a cheque cashing automated teller machine (ATM).

A cheque cashing ATM allows a registered user, who typically does not have a bank account, to cash a cheque and receive money from the ATM in a public access, unattended environment. A user typically registers with an institution that owns or operates cheque cashing ATMs, and provides identification information (such as a social security number) and information about a cheque (usually a pay cheque) that he/she regularly receives. The registered user is typically provided with a card to initiate a cheque cashing transaction at a cheque cashing ATM. The cheque information typically includes details of how frequently a cheque is paid (for example, every week), who the cheque is paid by (that is, the payor of the cheque), the payor's bank details (for example, a bank code identifying the name of the bank), the typical amount that the cheque is made out for, and such like.

To cash a cheque, a user enters his/her card at a cheque cashing ATM, then enters a cheque to be cashed through a cheque slot in the ATM's fascia A cheque transport mechanism receives the entered cheque and transports the cheque in a forward direction along a cheque transport path to a number of locations within the ATM to process this cheque. If the cheque is valid, and the details printed on the cheque match the cheque information provided during registration, then the ATM informs the user of a surcharge that will be applied if the user wishes to cash the cheque. If the user does not agree to the surcharge, then the cheque is returned in the reverse direction along the cheque transport path to the user via the cheque slot. If the user agrees to the surcharge, then cash is dispensed to the user and the cheque is transported to and stored in a storage bin within the ATM. An endorser printer prints an endorsement onto the cheque as the cheque is being transported to the storage bin.

A problem associated with cheque cashing ATMs relates to the condition of the cheques that are presented to the endorser printer for printing endorsements thereon. It is difficult for the endorser printer to print endorsements onto cheques that have defects such as large tears, holes, creases, folds, dogears, and such like, without the increased likelihood that such cheques will become jammed into a printhead of the endorser. A substantial percentage of cheques entered at a cheque cashing ATM include one or more of these defects. When such a jam condition occurs, the result is usually the cheque cashing ATM going out of service until a service call is made. It would be desirable to minimize the likelihood of such jam conditions occurring at cheque cashing ATMs.

SUMMARY OF THE INVENTION

In accordance with one aspect of the present invention, a self-service terminal comprises a fascia including means defining a document slot, and a document processing module including (i) means defining a document transport path, (ii) a document transport mechanism for transporting a document along the document transport path, (iii) an endorser including a printhead disposed along the document transport path and for printing an endorsement onto a document, and (iv) means for preventing a document from being jammed into the printhead as the document is being transported along the document transport path in the vicinity of the endorser.

Preferably, the means for preventing a document from being jammed into the printhead comprises a door covering an opening and slidable between an open position in which the printhead is able to move through the opening to print an endorsement onto a document and a closed position in which the door prevents the document from being jammed into the printhead as the document is being transported along the document transport path in the vicinity of the printhead. The door includes a major surface and a plurality of finger-like projections disposed on the major surface and for engaging a document as the document moves into position along the document transport path for the printhead to print an endorsement onto the document. The document processing module may include a magnetic ink character recognition (MICR) reader disposed along the document transport path and for reading a MICR codeline of a document which is transported along the document transport path.

In accordance with another aspect of the present invention, an automated teller machine (ATM) comprises an ATM fascia including (i) means defining a currency dispensing slot through which currency can be dispensed to an ATM customer, and (ii) means defining a cheque entrance slot, a currency dispenser for dispensing currency via the currency dispensing slot to an ATM customer, and a cheque processing module including (i) means defining a cheque transport path, (ii) an endorser including a printhead disposed along the cheque transport path and for printing an endorsement onto a cheque, (iii) a cheque transport mechanism for transporting a cheque along the cheque transport path from the cheque entrance slot to a cheque endorsing zone in the vicinity of the endorser, and (iv) means for preventing a cheque from being jammed in the printhead when the cheque moves into the cheque endorsing zone.

Preferably, the means for preventing a cheque from being jammed in the printhead comprises a door covering an opening and slidable between an open position in which the printhead is able to move through the opening to print an endorsement onto a cheque and a closed position in which the door prevents the cheque from being jammed into the printhead as the cheque is being transported along the cheque transport path into the cheque endorsing zone. The door includes a major surface and a plurality of finger-like projections disposed on the major surface and for engaging a cheque as the cheque moves into cheque endorsing zone along the cheque transport path for the printhead to print an endorsement onto the cheque. The cheque processing module may include a magnetic ink character recognition (MICR) reader disposed along the cheque transport path and for reading a MICR codeline of a cheque which is transported along the cheque transport path.

In accordance with yet another aspect of the present invention, an apparatus is provided for use in a self-service terminal having a document transport path. The apparatus comprises an endorser disposed along the document transport path and including a printhead for printing an endorsement onto a document along the document transport path, means defining an opening through which the printhead can move to print an endorsement onto a document along the document transport path, and a door covering the opening and slidable between an open position in which the printhead is able to move through the opening to print an endorsement onto a cheque and a closed position in which the door prevents the cheque from being jammed into the printhead when the cheque is transported along the cheque transport path. Preferably, the door includes a major surface and a plurality of finger-like projections disposed on the major surface and for engaging a cheque when the cheque moves into a position along the cheque transport path for the printhead to print an endorsement onto the cheque.

In accordance with still another aspect of the present invention, a method of processing a financial instrument at a self-service terminal comprises the steps of transporting the financial instrument to an endorsing zone of the self-service terminal, and engaging the financial instrument when the financial instrument moves into the endorsing zone to prevent the financial instrument from jamming into parts of an endorser disposed in the endorsing zone of the self-service terminal. The financial instrument may comprise a cheque.

BRIEF DESCRIPTION OF THE DRAWINGS

These and other aspects of the present invention will be apparent from the following specific description, given by way of example, with reference to the accompanying drawings, in which.

DETAILS OF THE INVENTION

Figure 1:
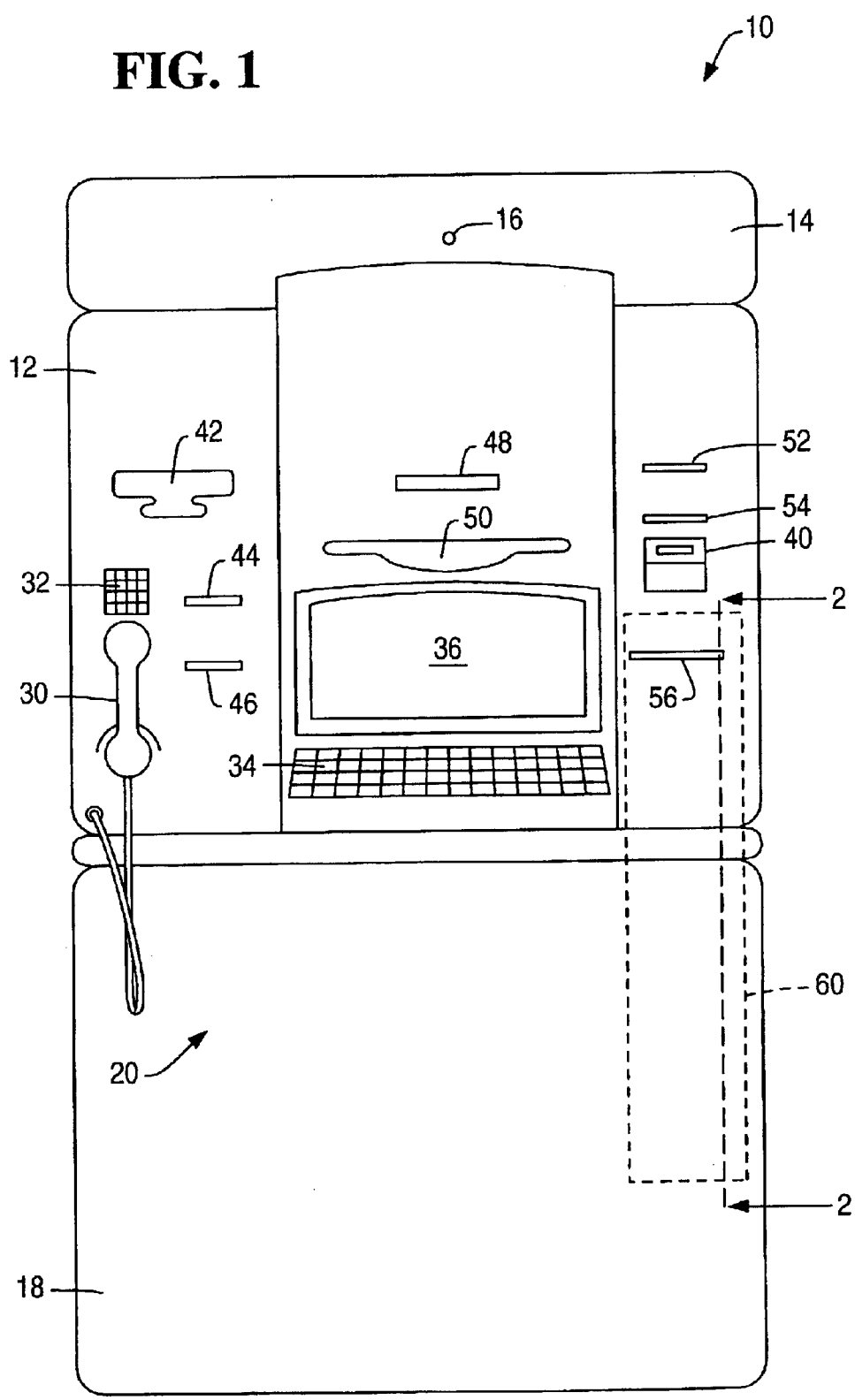
FIG. 1 is a pictorial diagram of a cheque cashing ATM embodying the present invention.

Reference is first made to FIG. 1, which illustrates a self-service terminal 10 in the form of a cheque cashing ATM. The ATM 10 comprises a fascia 12 pivotably coupled to a chassis (not shown); an upper panel 14 mounted to the chassis and defining an aperture 16 through which a camera (not shown) images a user of the ATM 10; and a lower panel 18 hingeably coupled to the chassis (not shown) so that the lower panel 18 can be opened to reveal a safe (not shown) mounted in the chassis (not shown). When the lower panel 18 is open, the fascia 12 can be pivoted upwards to reveal ATM modules mounted within the chassis (not shown).

The fascia 12 and lower panel 18 provide a user interface 20 for allowing a user to execute a transaction. The fascia 12 includes a handset 30 and a telephone keypad 32 for allowing a user to contact a remote operator (not shown) typically located in a call centre (not shown). The fascia 12 also includes an encrypting keyboard 34 for allowing a user to enter transaction details, and a display 36 for presenting screens to a user. The fascia 12 also defines eight slots for receiving and dispensing media items, and a tray 40 into which coins can be dispensed. The slots include: a money order printer slot 42, a bunch note input slot 44, a bunch note exit slot 46, a statement output slot 48, a cash dispense slot 50, a card reader slot 52, a card issue slot 54, and a cheque input/output slot 56. The slots 42 to 56 and tray 40 are arranged so that when the fascia 12 is closed, the slots and tray align with corresponding ATM modules mounted within the ATM's chassis (not shown). The user interface features described above are all provided on an NCR PERSONAS (trade mark) 5878 financial services centre ATM, available from NCR Financial Solutions Group Limited, Discovery Centre, 3 Fulton Road, Dundee, DD2 4SW, Scotland.

Figure 2:
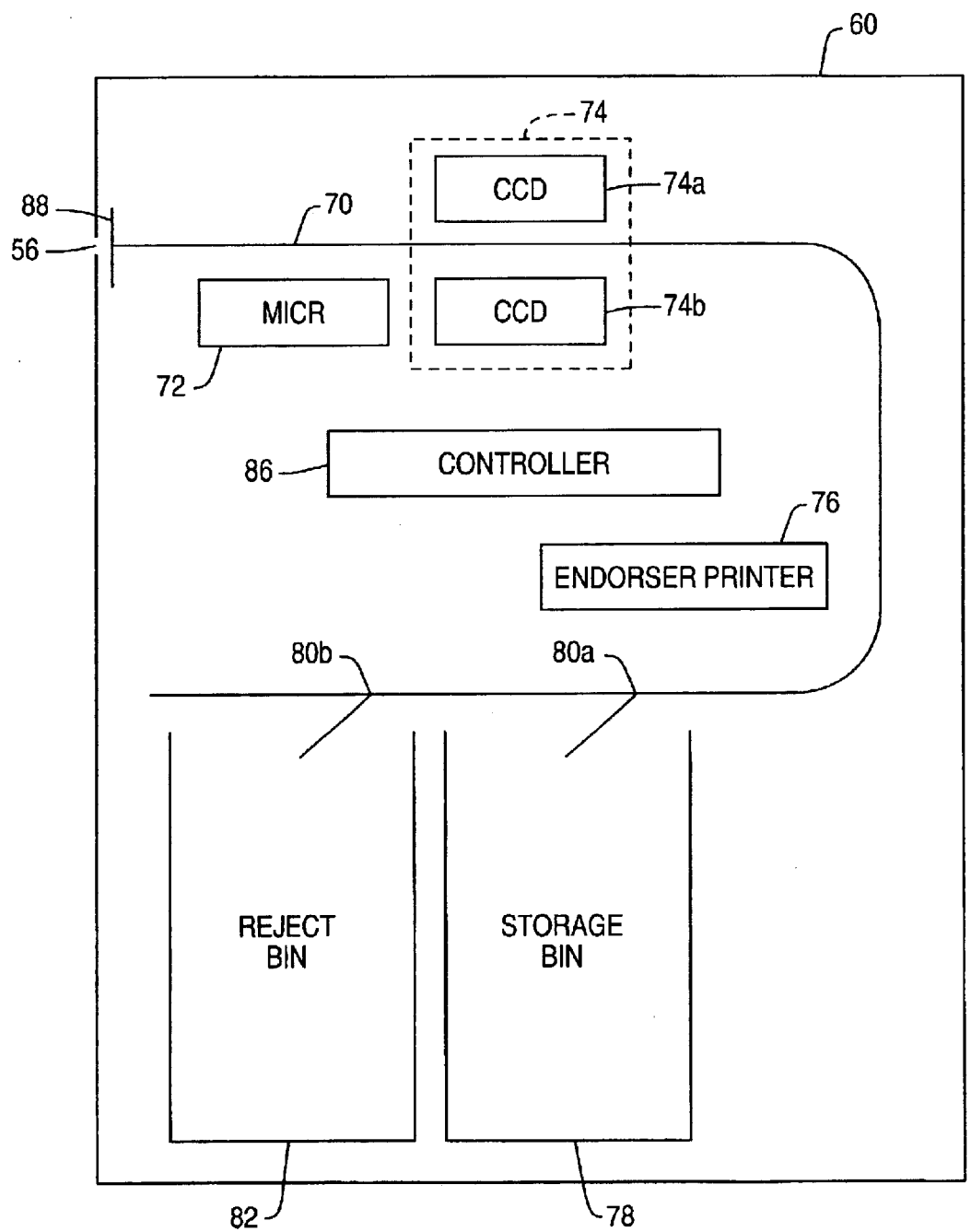
FIG. 2 is a simplified schematic sectional diagram, taken approximately along line 2—2 in FIG. 1, and showing a part (the cheque processing module) of the ATM of FIG. 1.
Figure 3:
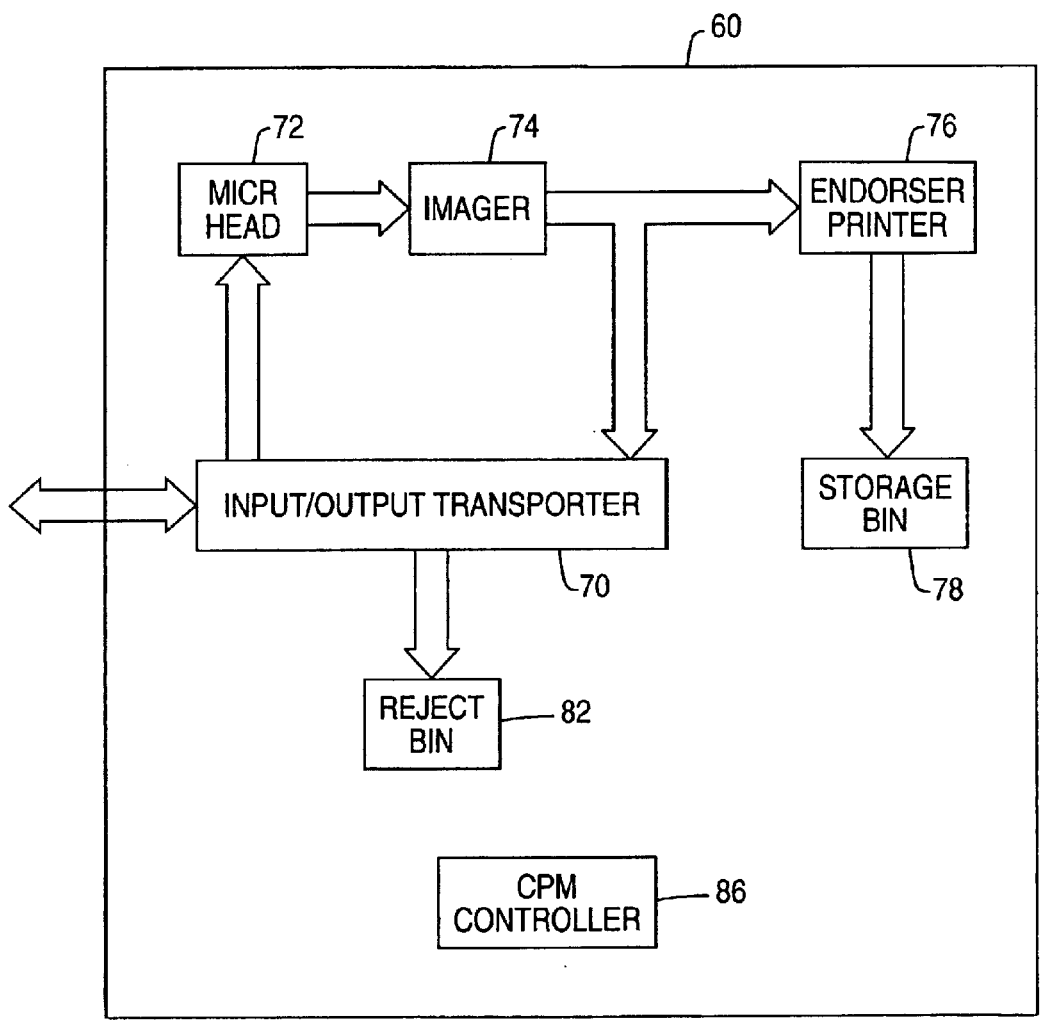
FIG. 3 is a block diagram of the cheque processing module of FIG. 2.

A cheque processing module (CPM) 60 will now be described with reference to FIG. 2 and FIG. 3. FIG. 2 is a simplified schematic sectional diagram (along line 2—2 in FIG. 1) showing part of the fascia 12 and lower panel 18, and the main parts of the CPM 60. FIG. 3 is a block diagram illustrating the main elements in the CPM 60. The CPM 60 is a modified version of a conventional cheque processing module, such as the cheque processing module provided with the PERSONAS (trade mark) 5878 NCR ATM.

The CPM 60 comprises the following elements: a cheque input/output transport mechanism 70 including an alignment mechanism for aligning a cheque; a MICR head 72 for reading magnetic details on a code line of a cheque; an imager 74 including an upper 74a and lower 74b CCD camera for capturing an image of each side of a cheque (front and rear); a printer 76 for endorsing a cheque; a storage bin 78 for storing processed cheques, and a reject bin 82 for storing rejected cheques. The transport mechanism 70 includes two divert gates 80a, 80b for diverting cheques to either the storage bin 78 or the reject bin 82. The elements are conventional and will not be described in detail herein. The CPM 60 also includes a controller 86 for controlling the operation of the elements within the CPM 60. The CPM 60 also includes an entrance shutter 88 for opening and closing the cheque input/output slot 56.

Figure 4:
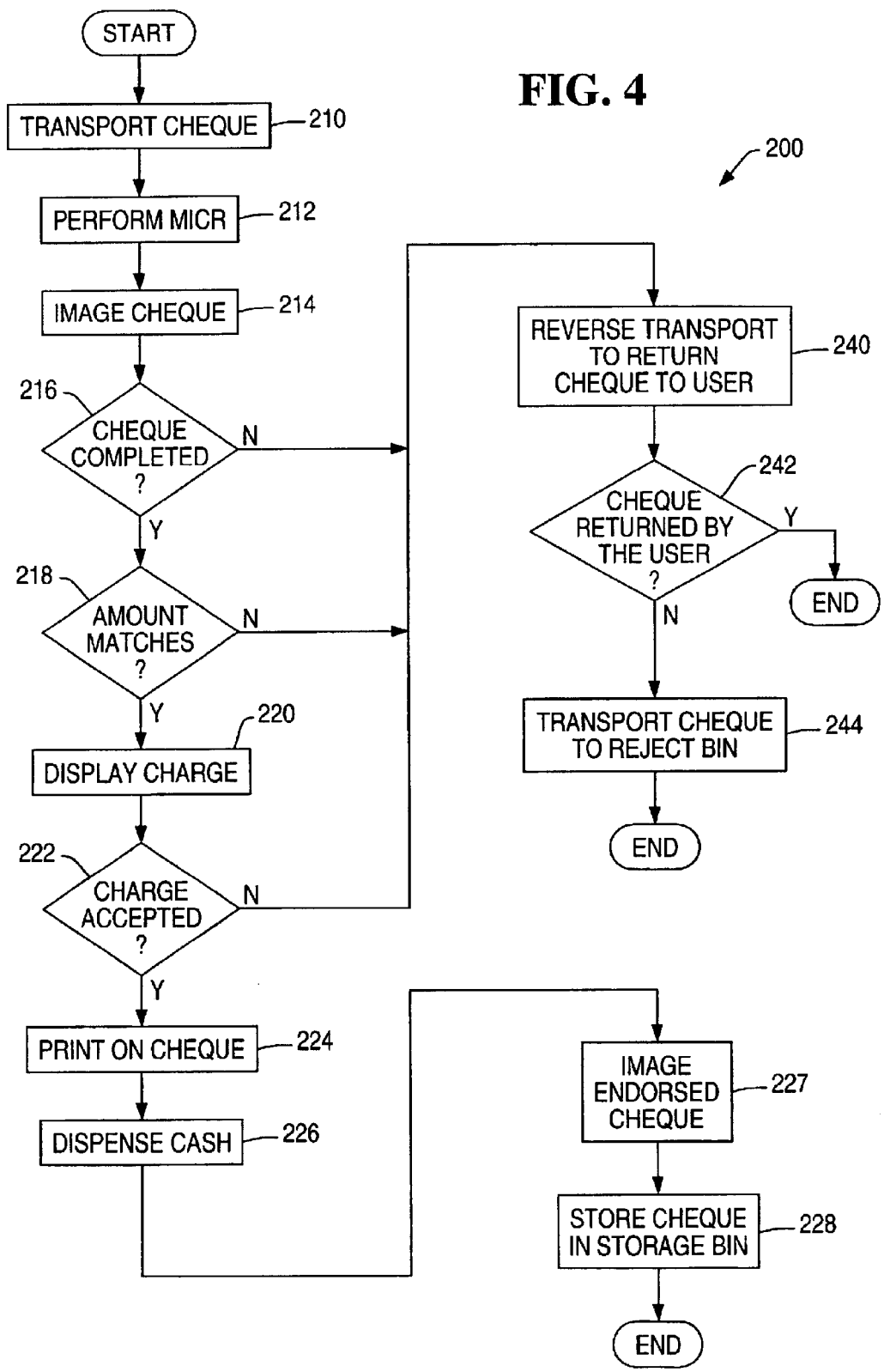
FIG. 4 is a flowchart illustrating the steps involved in a cheque cashing operation.

A typical transaction will now be described with reference to FIG. 4 which is a flowchart 200 illustrating the steps involved in a cheque cashing transaction, and also with reference to FIGS. 1 to 3. In this transaction, a user has registered with an institution owning and operating the ATM 10, and the user has informed the institution that he receives a weekly pay cheque for two hundred dollars, and has received a registration card for accessing cheque cashing functions at the ATM 10. Initially, the user enters the registration card into the card reader slot 52, selects "cheque cashing" from a list of transaction options presented on the display 36, and inserts the cheque to be cashed through the cheque input/output slot 56. The controller 86 opens the slot shutter 88, the transport mechanism 70 receives the cheque and transports the received cheque (step 210) to the MICR head 72 where a code line on the cheque is read (step 212). The transport mechanism 70 then transports the cheque to the imager 74, where both sides of the cheque are imaged (step 214).

The controller 86 then verifies that the cheque has been completed correctly (step 216). If the cheque is incomplete, then the controller 86 initiates a cheque return operation, described below. If the cheque is complete, then the controller 86 verifies that the amount printed in a courtesy amount field on the cheque matches details provided by the user when the user registered with the institution operating the cheque cashing ATM 10 (step 218). In this example, the user registered a two hundred dollars cheque that was received weekly, and the cheque being presented is made out for two hundred dollars. If the amounts do not match, then the controller 86 initiates a cheque return operation, described hereinbelow. If the amounts do match, as in this example, then the display 36 displays the charge that will be deducted for cashing the cheque (step 220), in this example five dollars, and requests the user to confirm that he is willing to pay this charge to cash the cheque (step 222).

If the user accepts the charge, then the printer 76 prints endorsement data onto the cheque (step 224), and cash is dispensed through the cash dispense slot 50 to the user (step 226). The cash is to the value of the courtesy amount of the cheque minus the charge levied for cashing the cheque, in this example, one hundred and ninety five dollars. The cheque is then transported to the imager 74 to image the endorsed cheque (step 227) before it is transported to the storage bin 78 (step 228) for subsequent collection and further processing. If the user does not wish to pay the charge, then the controller 86 initiates a cheque return operation.

When a cheque return operation is initiated, the transport mechanism 70 reverses the direction of transport (step 240) to convey the cheque to the cheque input/output slot 56 to return the cheque to the user via the cheque input/output slot. The controller 86 may monitor the slot 56 to ensure that the cheque has been removed by the user (step 242). If the user has not removed the cheque within a predetermined time period, the cheque is retracted and conveyed to the reject bin 82 (step 244).

Figure 5:
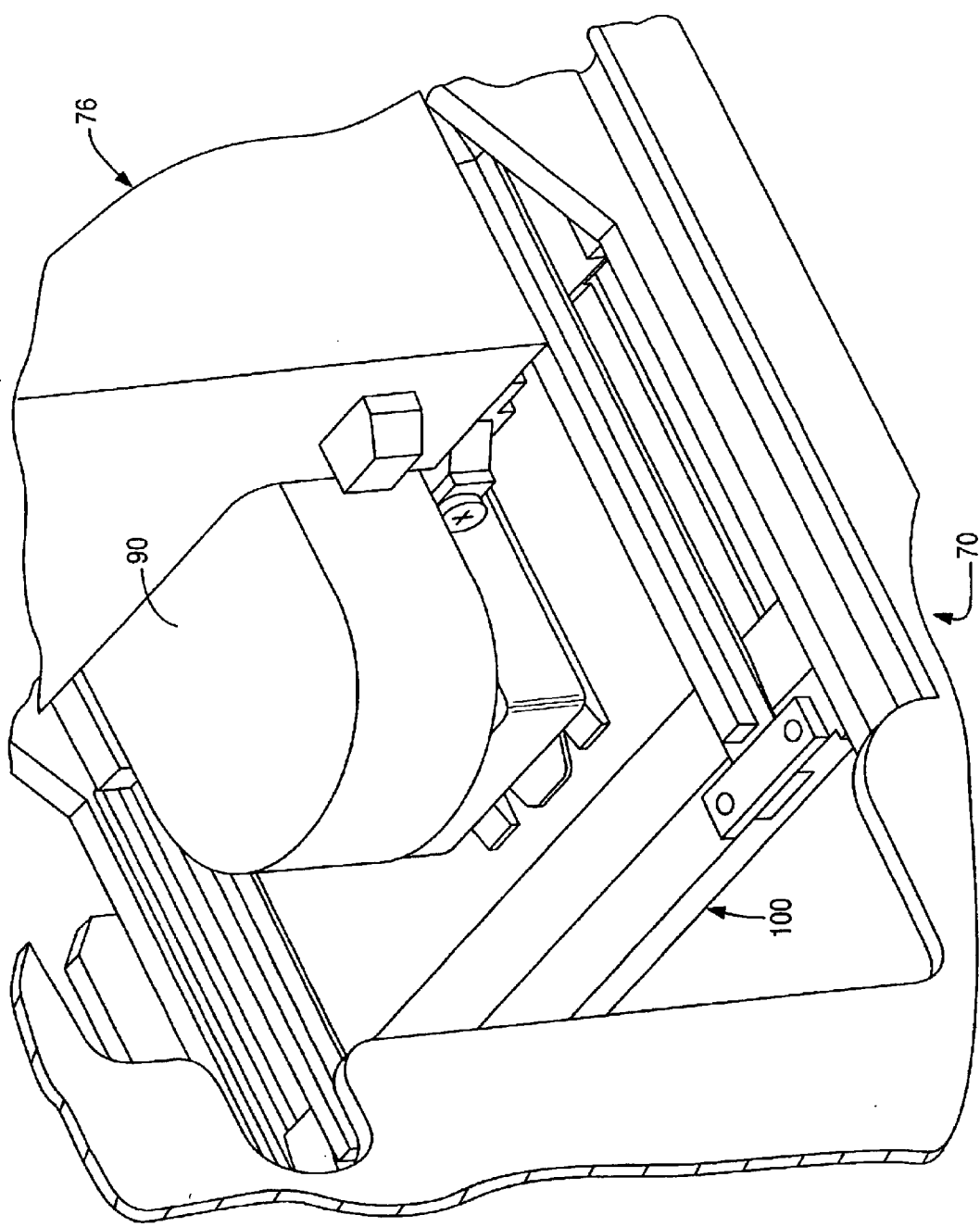
FIG. 5 is a pictorial diagram of a part (the endorser printer) of the cheque processing module of FIG. 2 and showing parts in an initial position.
Figure 6:
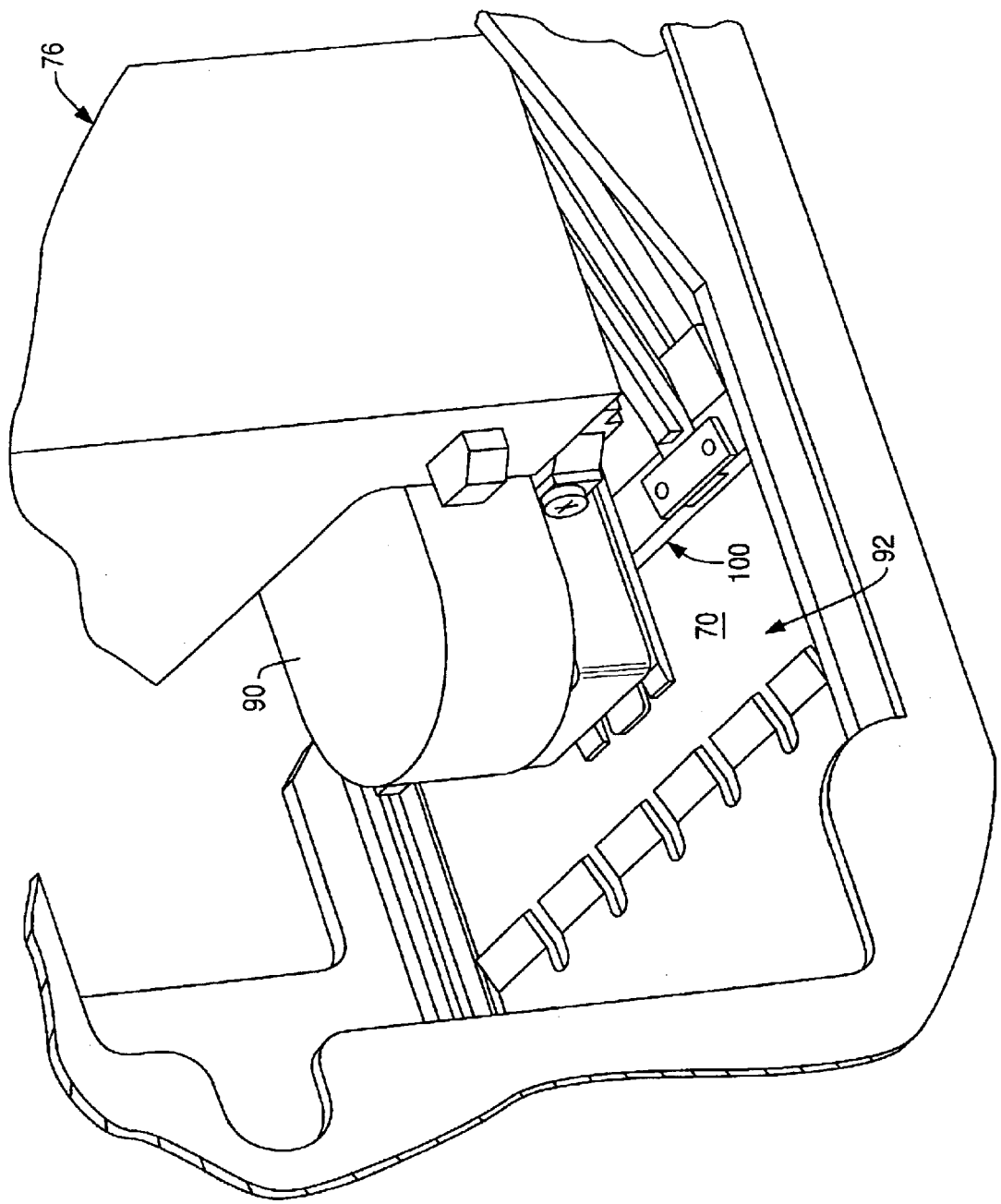
FIG. 6 is a pictorial diagram similar to FIG. 5 and showing parts in a different position.
Figure 7:
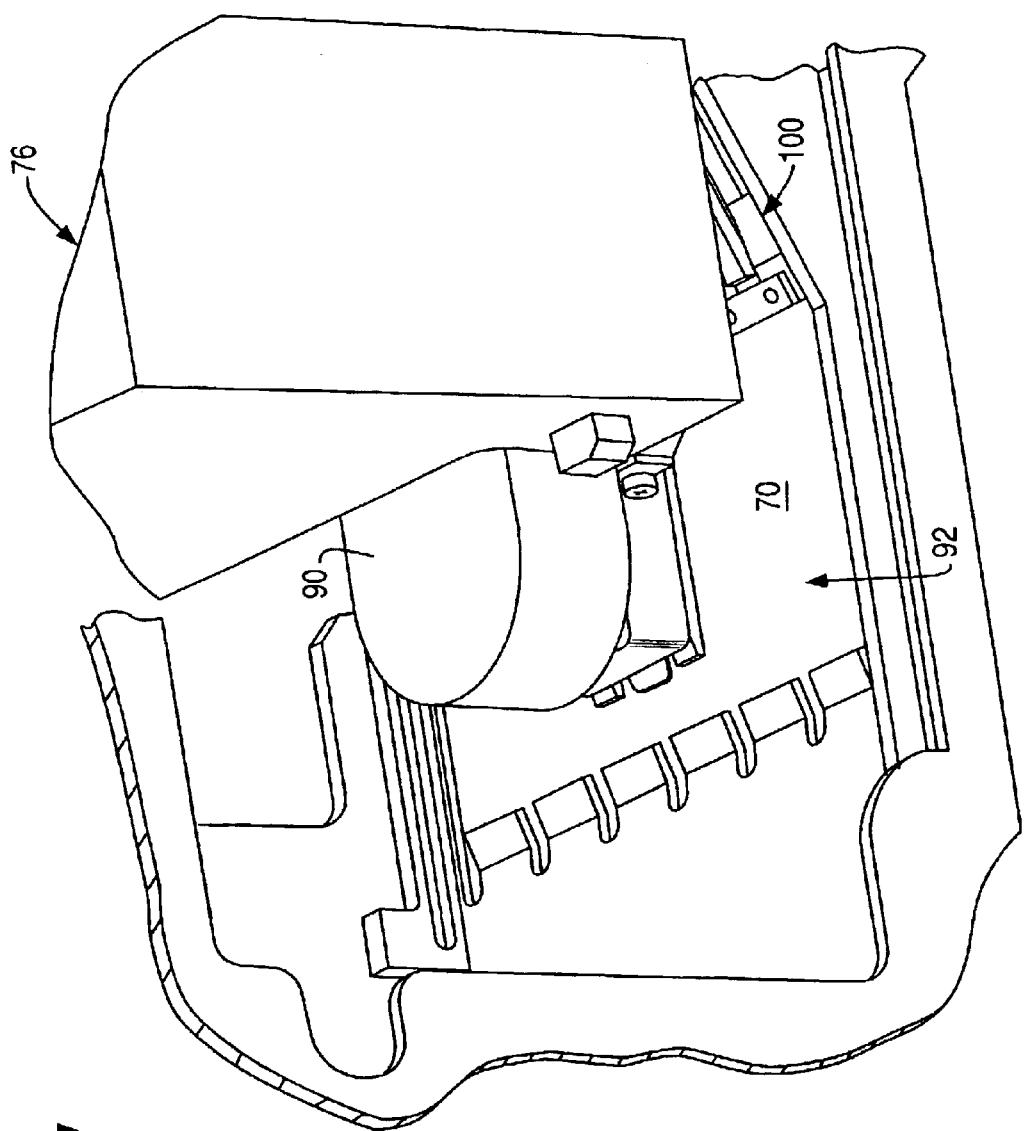
FIG. 7 is a pictorial diagram similar to FIG. 6 and showing parts in another different position.
Figure 8:
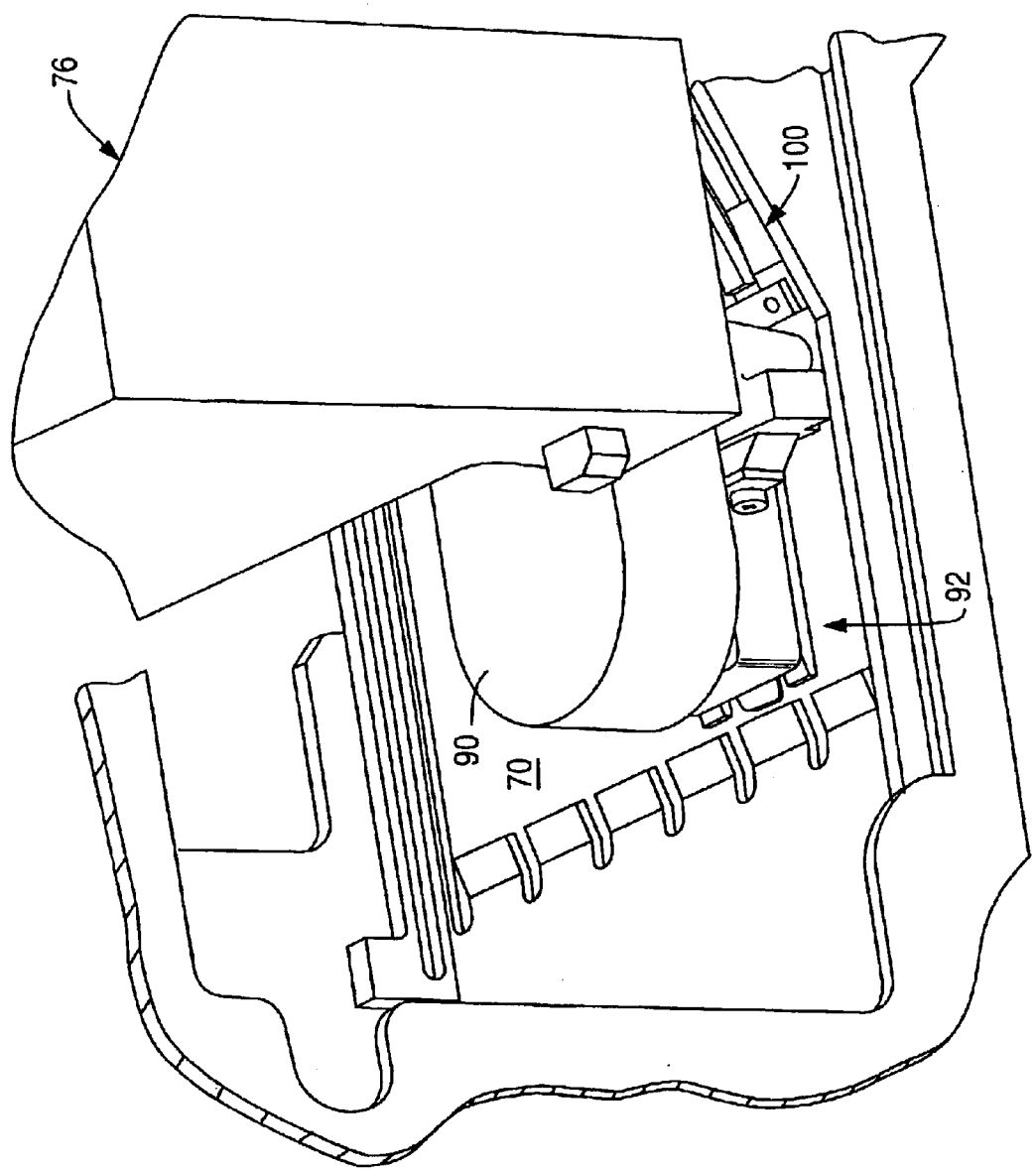
FIG. 8 is a pictorial diagram similar to FIG. 7 and showing a printhead of the endorser printer in a different position.

Referring to FIG. 5, details of the endorser printer 76 are illustrated. The endorser printer 76 includes a printhead 90 disposed on one side of a slidable door member 100. The document transport path 70 lies on the other side of the door 100. In FIG. 5, the door 100 is shown in a closed position separating the printhead 90 apart from the document transport path 70. Also in FIG. 5, the printhead 90 is shown in a retracted position ready to print onto a document in the document transport path 70 after the door 100 opens. When the door 100 opens, the door moves from the closed position shown in FIG. 5 through a partially opened position such as shown in FIG. 6 to a fully opened position as shown in FIG. 7 to provide an opening 92 through which the printhead 90 can move to print an endorsement onto the document in the document transport path 70. More specifically, after the door 100 reaches the fully opened position shown in FIG. 7, the printhead 90 moves from the retracted position shown in FIG. 7 through the opening 92 to a printing position as shown in FIG. 8 to print an endorsement onto the document in the document transport path 70.

Figure 9:
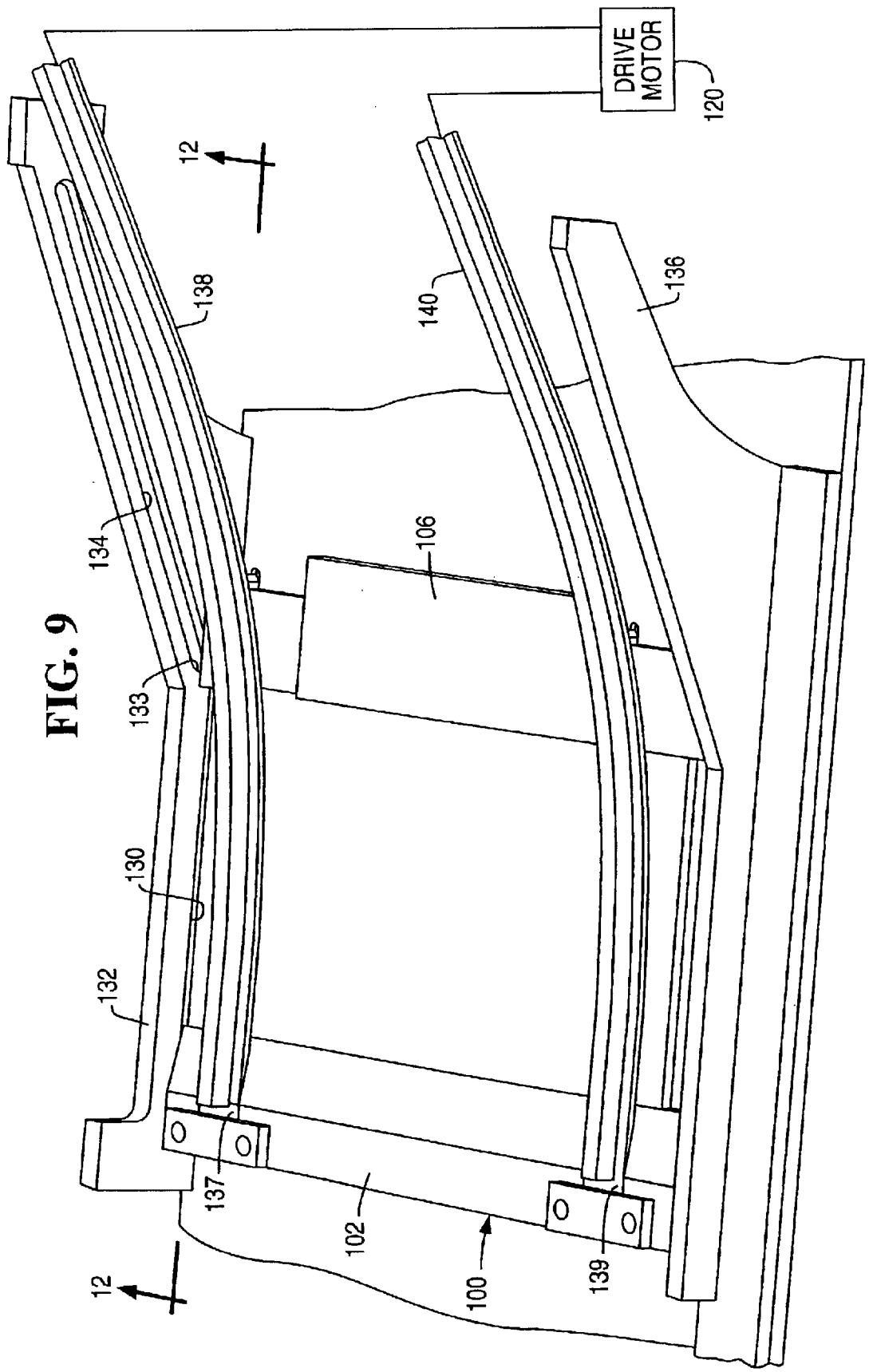
FIG. 9 is a pictorial diagram similar to FIG. 8 and showing the printhead of the endorser printer removed.
Figure 10:
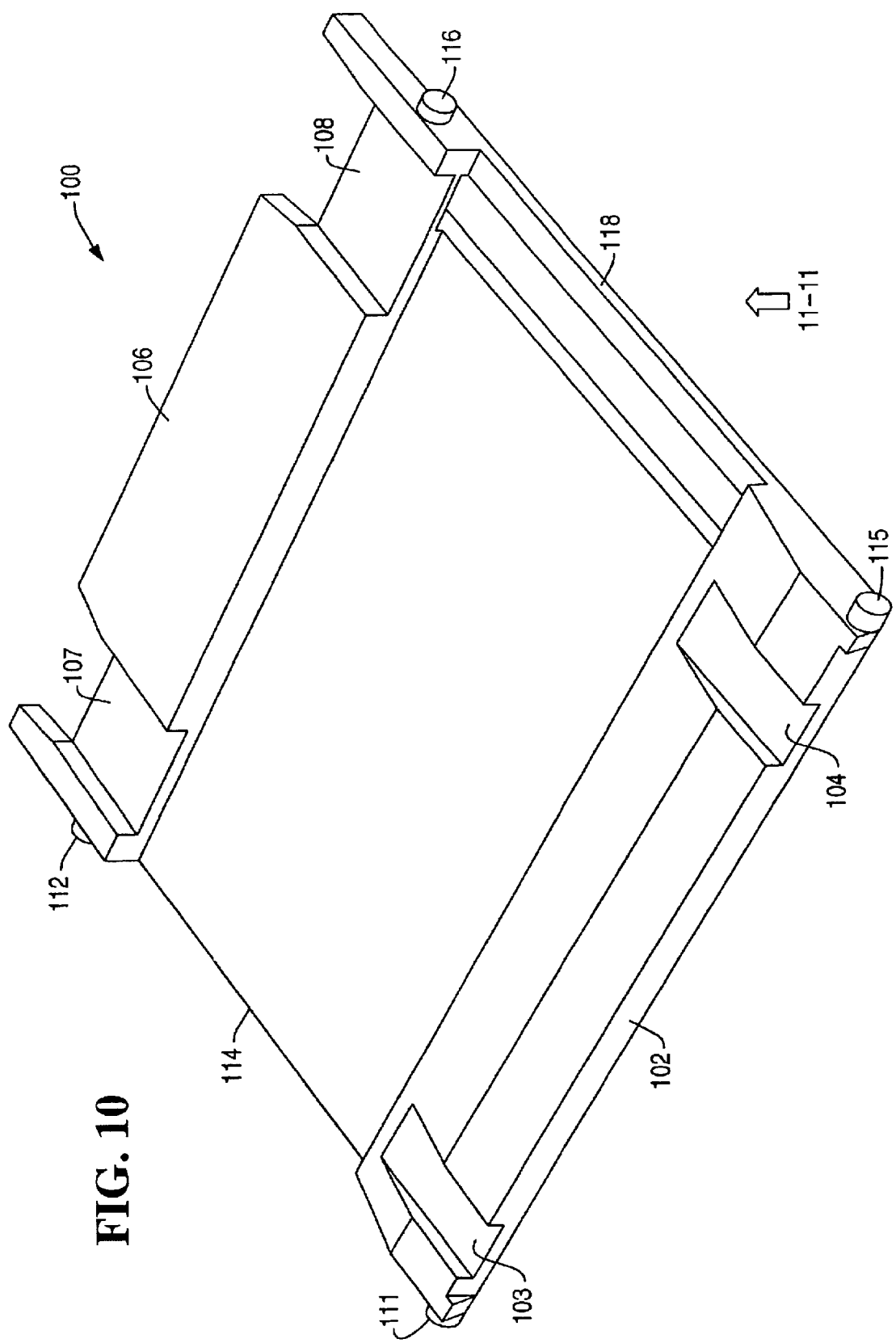
FIG. 10 is a pictorial diagram of a slidable door shown in FIG. 9.
Figure 11:
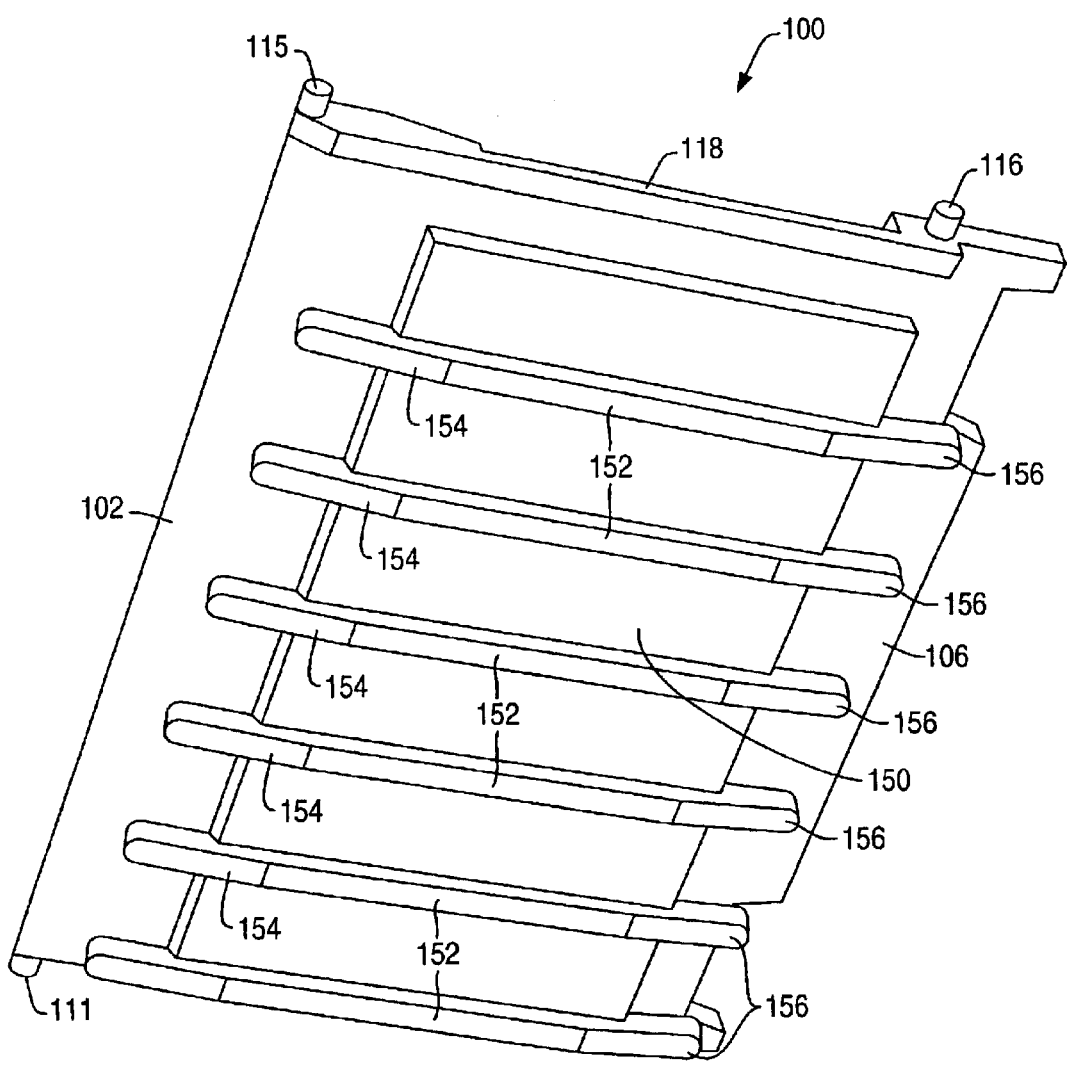
FIG. 11 is a view looking approximately in the direction of arrow 11—11 in FIG. 10 and showing an opposite side of the slidable door.

Referring to FIG. 9, a pictorial view similar to the pictorial view of FIG. 5 is shown with the printhead 90 removed to better illustrate details of the door 100. Further, the door 100 by itself is shown in more detail in FIG. 10, and FIG. 11 shows a view of the door 100, looking approximately in the direction of arrow 11—11 in FIG. 10. With reference to FIGS. 9 and 10, the door 100 has a first edge portion 102 in which two relatively smaller recesses 103, 104 are formed and a second edge portion 106 in which two relatively larger recesses 107, 108 are formed. Two cylindrically-shaped projections 111, 112 extend away from a third edge portion 114 of the door 100, and two cylindrically-shaped projections 115, 116 extend away from a fourth edge portion 118 of the door. The first and second edge portions 102, 106 are opposite each other, and the third and fourth edge portions 114, 118 are opposite each other.

Figure 12:
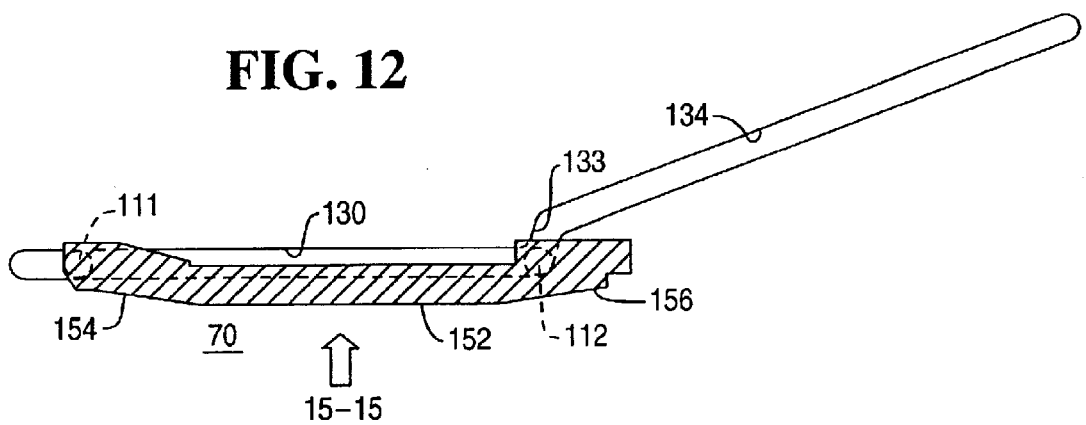
FIG. 12 is a simplified sectional view looking approximately along line 12—12 in FIG. 9 and showing the slidable door of FIG. 10 in a fully closed position.

A simplified sectional view looking approximately along line 12—12 shown in FIG. 9 is shown in FIG. 12. Referring to FIGS. 9 and 12, the projection 111 along the third edge portion 114 of the door 100 projects into a horizontal elongated slot portion 130 of a first rail member 132, and the projection 112 projects into a relatively steep oblique elongated slot portion 133 which interconnects the horizontal elongated slot portion 130 of the first rail 132 and a relatively shallow oblique elongated slot portion 134 of the first rail 132. Similarly, the projection 115 along the fourth edge portion 118 of the door 100 projects into a horizontal elongated slot portion (not shown) of a second rail member 136, and the projection 116 projects into a relatively steep oblique elongated slot portion (also not shown) which interconnects the horizontal elongated slot portion of the second rail 136 and a relatively shallow oblique elongated slot portion (also not shown) of the second rail 136. One end 137 of a first flexible guide member 138 is secured in the recess 103 in the first edge portion 102 of the door 100. The other end of the first guide 138 is attached to a drive motor 120 (shown only schematically in FIG. 9). Similarly, one end 139 of a second flexible guide member 140 is secured in the other recess 104 in the first edge portion 102 of the door 100. The other end of the second guide 140 is also attached to the drive motor 120.

Referring to FIGS. 11 and 12, the door 100 has a major surface 150 on which a plurality of finger-like projections 152 are disposed. The projections 152 are provided for engaging a document in the document transport path 70 when the document moves into position on the document transport path to have the printhead 90 of the endorser printer 76 print an endorsement on the document. A first plurality of angled fingers 154 extend away from one end of the plurality of finger-like projections 152, and a second plurality of angled fingers 156 extend away from an opposite end of the plurality of finger-like projections 152. Each pair of angled fingers of the first and second plurality of angled fingers 154, 156 is angled relative to the corresponding projection of the plurality of finger-like projections 152, and thus relative to a flat plane of the document transport path 70 to allow for a document to be more easily transported into or out of position on the document transport path for the printhead 90 of the endorser printer 76 to print an endorsement on the document.

Figure 13:
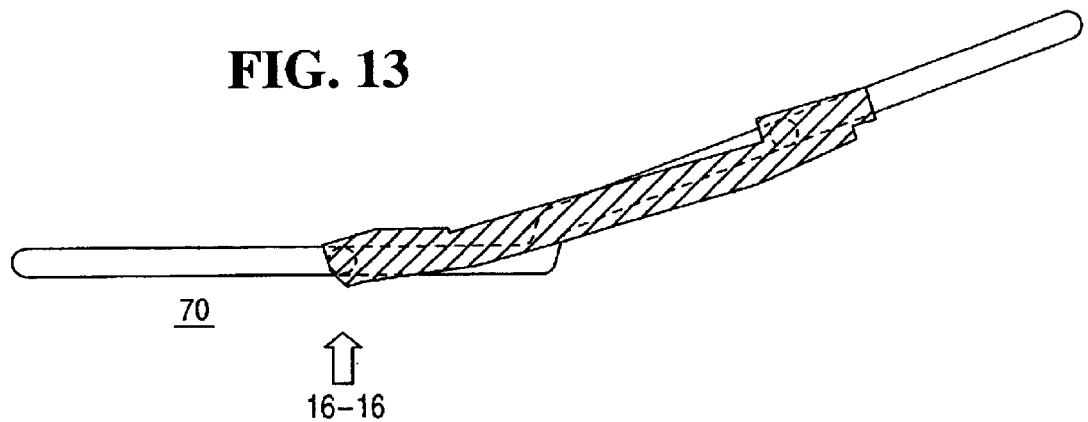
FIG. 13 is a view similar to FIG. 12 and showing parts in a position corresponding to the slidable door of FIG. 10 in a partially opened position.
Figure 14:
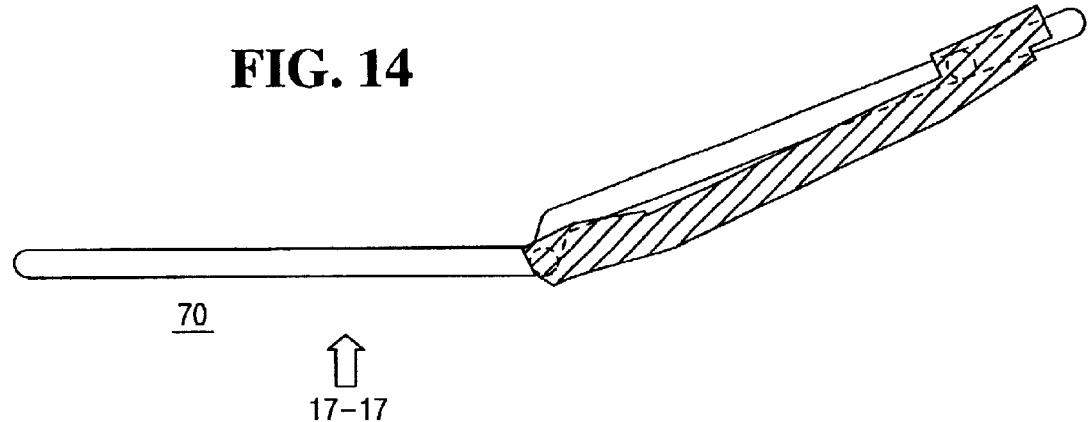
FIG. 14 is a view similar to FIG. 13 and showing parts in a position corresponding to the slidable door of FIG. 10 in a completely opened position.
Figure 15:
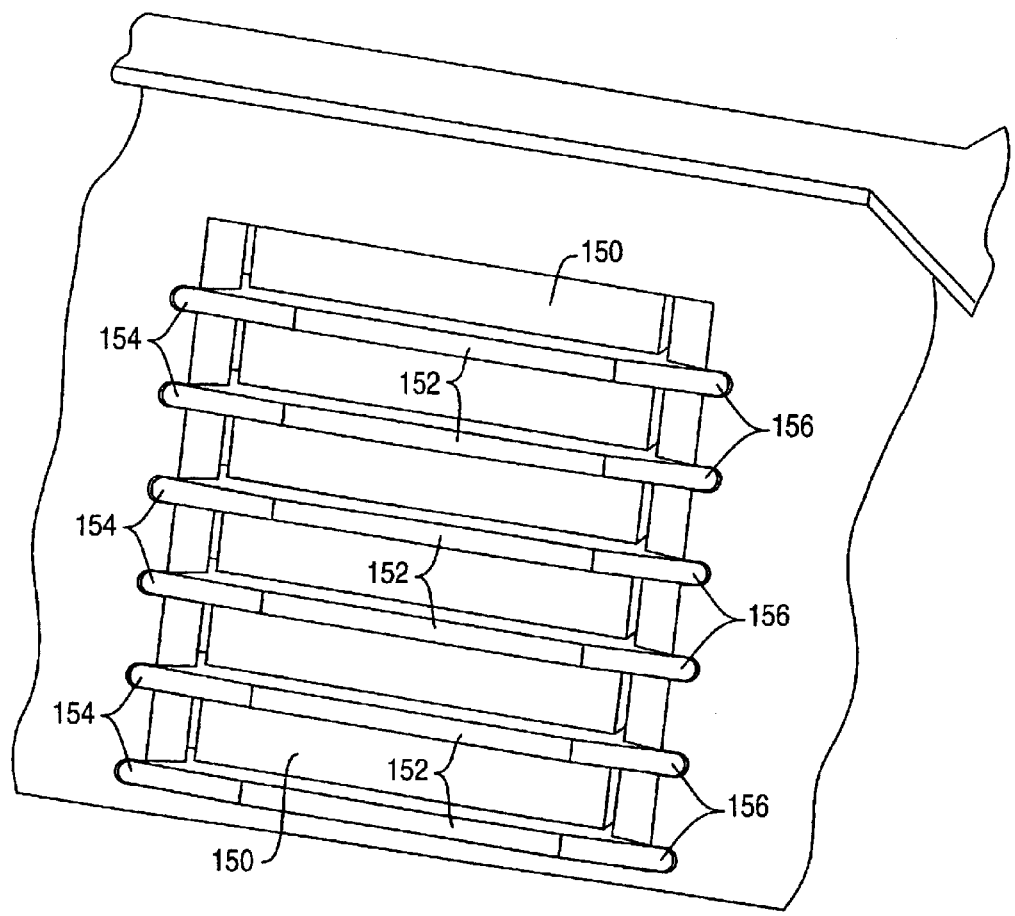
FIG. 15 is a view looking approximately in the direction of arrow 15—15 in FIG. 12.

To open the door 100, the drive motor 120 is actuated to pull the first and second guides 138, 140 to the right (as viewed looking at FIG. 9) which, in turn, moves the door from the fully closed position shown in FIG. 12 through a partially opened position such as shown in FIG. 13 to the fully opened position shown in FIG. 14. A view looking in the direction of arrow 15—15 shown in FIG. 12 is shown in FIG. 15. Similarly, a view looking in the direction of arrow 16—16 shown in FIG. 13 is shown in FIG. 16, and a view looking in the direction of arrow 17—17 shown in FIG. 14 is shown in FIG. 17.

Figure 16:
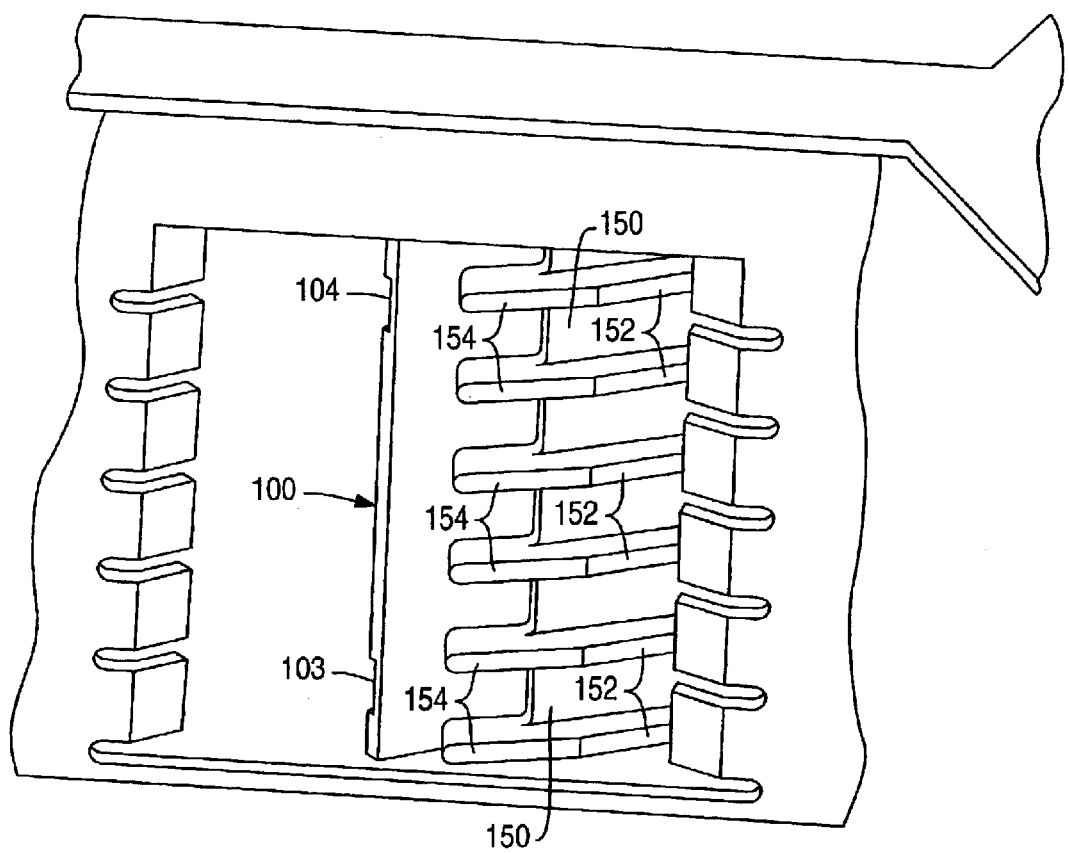
FIG. 16 is a view looking approximately in the direction of arrow 16—16 in FIG. 13.

More specifically, as the door 100 moves from the fully closed position of FIGS. 12 and 15 to the partially opened position of FIGS. 13 and 16, the projection 112 along the third edge portion 114 of the door 100 initially moves along the relatively steep oblique elongated slot portion 133 of the first rail 132, and the other projection 111 moves along the horizontal elongated slot portion 130 of the first rail 132. Similarly, the projection 116 along the fourth portion 118 of the door 100 initially moves along the relatively steep oblique elongated slot portion (not shown) of the second rail 136, and the other projection 115 moves along the horizontal elongated slot portion (also not shown) of the second rail 136. The projection 112 along the third edge portion 114 of the door 100 eventually reaches the relatively shallow oblique elongated slot portion 134 of the first rail 132 and continues to move along this slot portion 134. Similarly, the projection 116 along the fourth portion 118 of the door 100 eventually reaches the relatively shallow oblique elongated slot portion (not shown) of the second rail 136 and continues to move along this slot portion.

It should be apparent that the projection 112 along the third edge portion 114 of the door 100 initially moves along the relatively steep oblique elongated slot portion 133 of the first rail 132, and the projection 116 along the fourth portion 118 of the door 100 initially moves along the relatively steep oblique elongated slot portion (not shown) of the second rail 136 so that the second plurality of angled fingers 156 on the door 100 can quickly move away from a frame part on which the door 100 is resting to provide sufficient clearance before the projection 112 begins its movement along the relatively shallow elongated slot portion 134 of the first rail 132 and the projection 116 begins its movement along the relatively shallow elongated slot portion (not shown) of the second rail 136. The recesses 107, 108 along the second edge portion 106 of the door 100 provides clearance for the two flexible guides 138, 140 to seat inside, of as the door 100 moves from the fully closed position of FIGS. 12 and 15 to the fully opened position of FIGS. 13 and 16.

Figure 17:
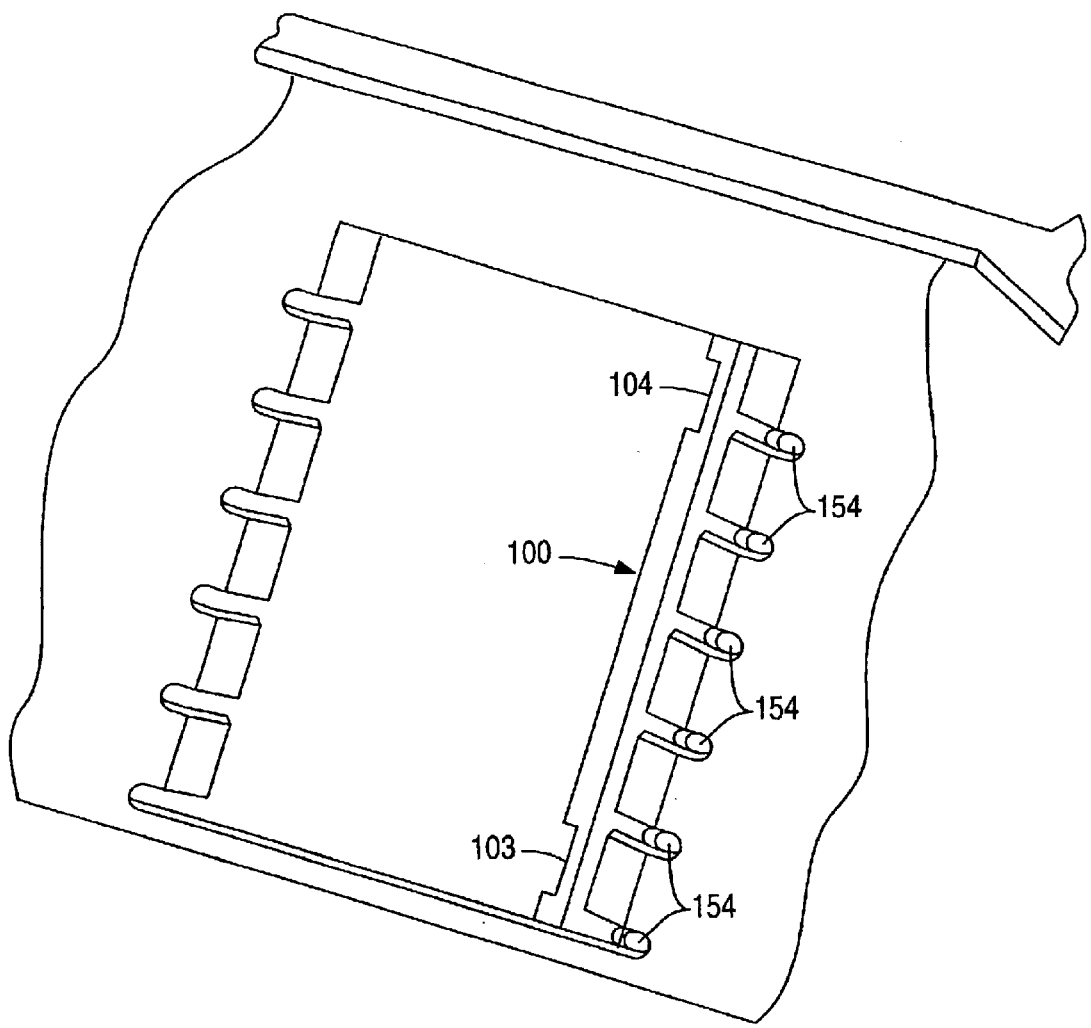
FIG. 17 is a view looking approximately in the direction of arrow 17—17 in FIG. 14.

When the door 100 is in the fully opened position as shown in FIGS. 14 and 17, the printhead 90 of the endorser printer 76 moves through the opening 92 to print an endorsement onto a document in the document transport path 70, as best shown in FIG. 8 and previously described hereinabove. After the printhead 90 prints an endorsement onto the document, the drive motor 120 reverses direction of rotation and moves pushes the first and second rails 138, 140 to the left (as viewed looking at FIG. 9) such that the door 100 moves from the fully opened position shown in FIGS. 14 and 17 back through the partially opened position shown in FIGS. 13 and 16 to the fully closed position shown in FIGS. 12 and 15. The door 100 is now back in its initial position ready to receive another document in the document transport path 70 for printing an endorsement on the document in the same manner as just described hereinabove for the previous document.

Although the above-description describes a cheque being cashed in its entire amount by an ATM customer, it is contemplated that the cheque may be cashed only in partial amount of the entire amount of the cheque at the ATM 10, with the remaining amount of the cheque being deposited to a banking account. It is also conceivable that the entire amount of the cheque be deposited by an ATM customer into a banking account.

Also, although the above-description shows the printhead 90 of the endorser 76 as moving "downwards" (as viewed looking at FIG. 8) to print an endorsement onto a document in the document transport path 70, it is contemplated that the printhead could move in any direction, such as "upwards" or "sideways", to print an endorsement on a document in the document transport path, depending upon the location of the document transport path and position of the endorser printer 76 relative to the document transport path.

A number of advantages result by providing an apparatus in accordance with the present invention. One advantage is that the door 100 prevents a document from being jammed against the printhead 90 of the endorser printer 76 as the document is moving into position along the document transport path 70 at which the printhead can be moved from the retracted position to the printing position to print an endorsement on the document. Another advantage is that the first and second plurality of angled finger 154, 156 co-operate with the plurality of finger-like projections 152 to provide a relatively smooth transition for a document either moving into or out of the position at which the printhead 90 can print an endorsement on the document.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A self-service terminal comprising:
   a fascia including means defining a document slot; and
   a document processing module including (i) means defining a document transport path, (ii) a document transport mechanism for transporting a document along the document transport path, (iii) an endorser including a printhead disposed along the document transport path and for printing an endorsement onto the document, and (iv) means for preventing the document from being jammed into the printhead as the document is being transported along the document transport path in the vicinity of the endorser;
   wherein the means for preventing the document from being jammed into the printhead comprises a door covering an opening and slidable between an open position in which the printhead is able to move through the opening to print an endorsement onto the document and a closed position in which the door prevents the document from being jammed into the printhead as the document is being transported along the document transport path in the vicinity of the printhead.

2. A terminal according to claim 1, wherein the door includes a major surface and a plurality of finger-like projections disposed on the major surface and for engaging the document as the document moves into position along the document transport path for the printhead to print an endorsement onto the document.

3. A terminal according to claim 2, wherein the document processing module includes a magnetic ink character recognition (MICR) reader disposed along the document transport path and for reading a MICR codeline of the document which is transported along the document transport path.

4. An automated teller machine (ATM) comprising:

an ATM fascia including (i) means defining a currency dispensing slot through which currency can be dispensed to an ATM customer, and (ii) means defining a check entrance slot;

a currency dispenser for dispensing currency via the currency dispensing slot to an ATM customer; and a check processing module including (i) means defining a check transport path, (ii) an endorser including a printhead disposed along the check transport path and for printing an endorsement onto the check, (iii) a check transport mechanism for transporting the check along the check transport path from the check entrance slot to E check endorsing zone in the vicinity of the endorser, and (iv) means for preventing the check from being jammed in the printhead when the check moves into the check endorsing zone;

wherein the means for preventing the check from being jammed in the printhead comprises a door covering an opening and slidable between an open position in which the printhead is able to move through the opening to print an endorsement onto the check and a closed position in which the door prevents the check from being jammed into the printhead as the check is being transported along the check transport path into the check endorsing zone.

5. An ATM according to claim 4, wherein the door includes a major surface and a plurality of finger-like projections disposed on the major surface and for engaging the check as the check moves into check endorsing zone along the check transport path for the printhead to print an endorsement onto the check.

6. An ATM according to claim 5, wherein the check processing module includes a magnetic ink character recognition (MICR) reader disposed along the check transport path and for reading a MICR codeline of the check which is transported along the check transport path.

7. An apparatus for use in a self-service terminal having a document transport path, the apparatus comprising:

an endorser disposed along the document transport path and including a printhead for printing an endorsement onto a document along the document transport path;

means defining an opening through which the printhead can move to print the endorsement onto the document along the document transport path; and a door covering the opening and slidable between an open position in which the printhead is able to move through the opening to print the endorsement onto the document and a closed position in which the door prevents the document from being jammed into the printhead when the document is transported along the document transport path.

8. An apparatus according to claim 7, wherein the door includes a major surface and a plurality of finger-like projections disposed on the major surface and for engaging the document when the document moves into a position along the document transport path for the printhead to print an endorsement onto the document.

* * * * *

UNITED STATES PATENT AND TRADEMARK OFFICE
CERTIFICATE OF CORRECTION

PATENT NO. : 6,739,503 B1
DATED : May 25, 2004
INVENTOR(S) : Murison, A. S.

It is certified that error appears in the above-identified patent and that said Letters Patent is hereby corrected as shown below:

Column 9,
Line 13, delete "E" and insert -- a --.

Signed and Sealed this

Twenty-sixth Day of April, 2005

JON W. DUDAS
*Director of the United States Patent and Trademark Office*